United States Patent
Bouckaert et al.

(10) Patent No.: US 8,706,101 B2
(45) Date of Patent: Apr. 22, 2014

(54) METHOD AND APPARATUS FOR ASSOCIATING A SUBSCRIBER DIRECTORY IDENTIFIER TO A SUBSCRIBER IDENTIFIER

(75) Inventors: Philippe Bouckaert, Biot (FR); Sylvain Morandi, Cannes (FR); Dominique Petyt, Auribeau (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/375,881

(22) PCT Filed: Jun. 1, 2010

(86) PCT No.: PCT/EP2010/057614
§ 371 (c)(1),
(2), (4) Date: Jan. 17, 2012

(87) PCT Pub. No.: WO2010/139682
PCT Pub. Date: Dec. 9, 2010

(65) Prior Publication Data
US 2012/0115457 A1    May 10, 2012

(30) Foreign Application Priority Data
Jun. 5, 2009 (EP) .................................... 09305515

(51) Int. Cl.
*H04W 4/00* (2009.01)
*H04W 8/26* (2009.01)

(52) U.S. Cl.
USPC ......... 455/418; 455/435.1; 455/417; 370/310

(58) Field of Classification Search
USPC ........ 455/414.1, 418, 419, 420, 432.1, 432.2, 455/432.3, 433, 435.1, 435.2, 445, 461, 455/463, 466, 550.1, 551, 552.1, 558, 560, 455/417
See application file for complete search history.

(56) References Cited

U.S. PATENT DOCUMENTS

| | | | |
|---|---|---|---|
| 5,854,982 A * | 12/1998 | Chambers et al. | 455/445 |
| 6,606,491 B1 * | 8/2003 | Peck | 455/411 |
| 7,266,371 B1 * | 9/2007 | Amin et al. | 455/419 |
| 7,289,805 B2 * | 10/2007 | Tom et al. | 455/432.1 |
| 7,386,302 B2 * | 6/2008 | Riffe et al. | 455/417 |

(Continued)

FOREIGN PATENT DOCUMENTS

| | | |
|---|---|---|
| EP | 1519611 A2 | 3/2005 |
| WO | WO02099980 A2 | 12/2002 |
| WO | WO2009021555 A1 | 2/2009 |
| WO | WO2009053918 A2 | 4/2009 |

OTHER PUBLICATIONS

European Patent Office, International Search Report for PCT/EP20101057614 dated Jul. 22, 2010 (3 pages).

(Continued)

*Primary Examiner* — Mahendra Patel

(57) ABSTRACT

According to one embodiment of the present invention, there is provided a method, in a communication network, of associating a subscriber directory identifier to a first subscriber identifier. The method comprises receiving a request to connect a communication device to the network, the request including a subscriber identifier derived from the first subscriber identifier, determining the first subscriber identifier from the received subscriber identifier, and associating a subscriber directory identifier with the determined subscriber identifier.

16 Claims, 3 Drawing Sheets

(56) References Cited

U.S. PATENT DOCUMENTS

| | | | |
|---|---|---|---|
| 7,424,442 B2* | 9/2008 | Wong et al. | 705/14.68 |
| 7,991,394 B2* | 8/2011 | Gonen et al. | 455/432.1 |
| 8,145,212 B2* | 3/2012 | Lopresti et al. | 455/433 |
| 2002/0177440 A1* | 11/2002 | Mukherjee | 455/433 |
| 2004/0172536 A1* | 9/2004 | Malville et al. | 713/169 |
| 2005/0114680 A1* | 5/2005 | Chinnaswamy et al. | 713/185 |
| 2005/0130585 A1* | 6/2005 | Gnuschke et al. | 455/3.06 |
| 2006/0183500 A1* | 8/2006 | Choi | 455/558 |

OTHER PUBLICATIONS

European Patent Office, Written Opinion of International Searching Authority dated Jul. 22, 2010 (7 pages).

* cited by examiner

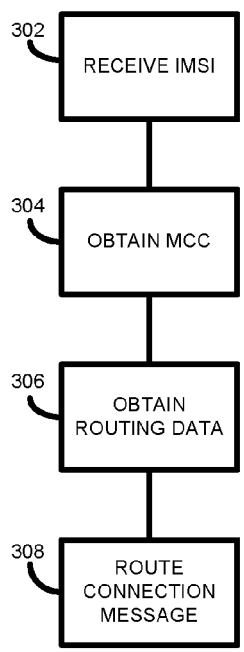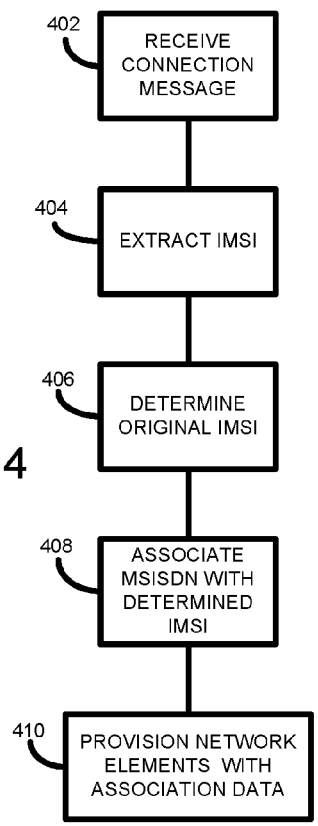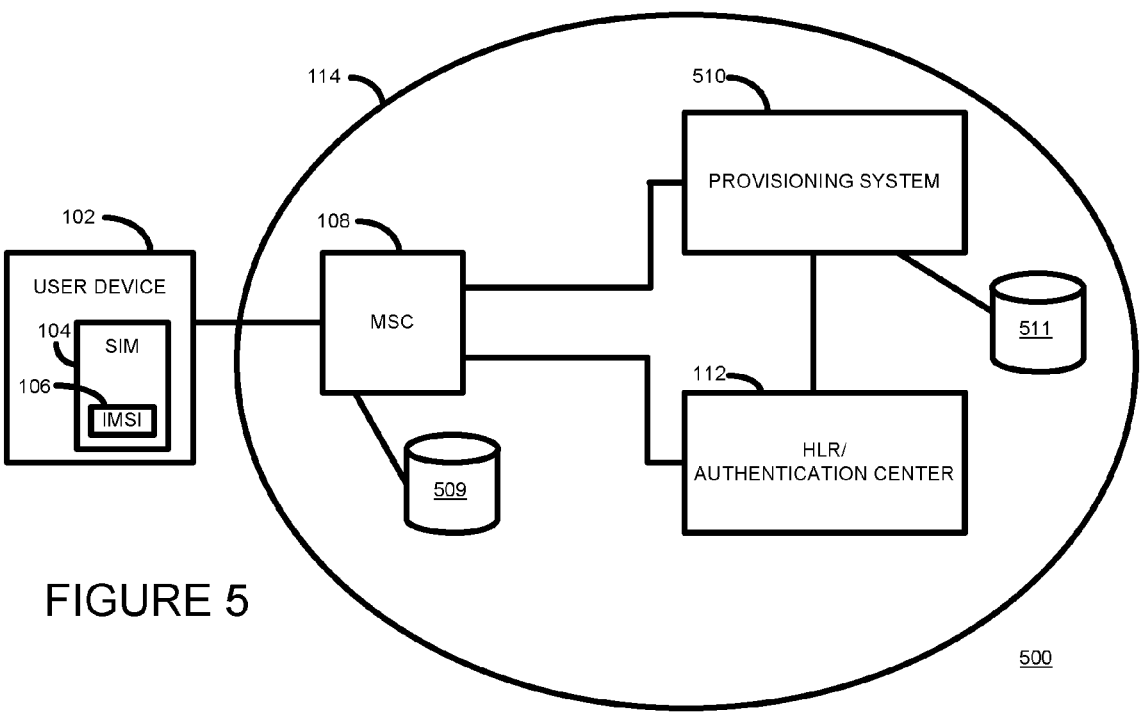

METHOD AND APPARATUS FOR ASSOCIATING A SUBSCRIBER DIRECTORY IDENTIFIER TO A SUBSCRIBER IDENTIFIER

CROSS-REFERENCE TO RELATED APPLICATIONS

This application is a national stage application under 35 U.S.C. §371 of PCT International Application No. PCT/EP2010/057614, filed Jun. 1, 2010, which claims priority to EP Application No. 09305515.0, filed Jun. 5, 2009, both hereby incorporated by reference.

BACKGROUND

In communication systems, such as mobile communications networks, the allocation of telephone numbers to subscribers needs to be carefully managed.

In GMS networks, for instance, network operators issue SIM cards for use in mobile communication devices, such as mobile telephones, with each SIM card containing a unique international mobile subscriber identity (IMSI). Until fairly recently, network operators pre-provisioned in their networks a mobile station international subscriber directory number (MSISDN), similar to a telephone number, for each IMSI on each SIM card issued. The situation is similar in many non-GSM communication networks.

One problem with pre-provisioning, however, is that issued SIM cards which have yet to be sold or given to customers already have an allocated MSISDN. Since network operators typically have a shortage of MSISDNs they may allocate to subscribers, pre-provisioning creates a number of difficulties with inventory management, as well as requiring databases, storage, and other computing equipment for storing and managing the pre-provisioned associations of MSISDNs with IMSIs.

Recently, over-the-air provisioning techniques have been developed. Over-the-air provisioning systems only associate an MSISDN to an IMSI the first time a communication device having a SIM card containing an IMSI connects to a communication network. Such techniques greatly facilitate the management and allocation of MSISDNs for network operators and alleviate many of the problems of pre-provisioning.

However, current over-the-air provisioning techniques are not suitable for use with all kinds of communication networks.

SUMMARY

One embodiment of the present invention may comprise a method, in a communication network, of associating a subscriber directory identifier to a first subscriber identifier. The method comprises receiving a request to connect a communication device to the network, the request including a subscriber identifier derived from the first subscriber identifier, determining the first subscriber identifier from the received subscriber identifier, and associating a subscriber directory identifier with the determined subscriber identifier.

A further embodiment of the present invention may comprise apparatus for associating a subscriber directory identifier to a first subscriber identifier of a communication network. The apparatus comprises a receiver for receiving a request to connect a communication device to the network, the request including a subscriber identifier derived from the first subscriber identifier, a first logic module for determining the first subscriber identifier from the received subscriber identifier, and a second logic module for associating a subscriber directory identifier with the determined subscriber identifier.

A yet further embodiment of the present invention may comprise a carrier carrying computer-implementable instructions that, when interpreted by a computer, cause the computer to perform the above-described method A yet further embodiment of the present invention may comprise a network comprising the above-described apparatus.

BRIEF DESCRIPTION

Embodiments of the invention will now be described, by way of non-limiting example only, with reference to the accompanying drawings, in which:

FIG. 3 is a flow diagram outline example processing steps taken in accordance with an embodiment of the present invention;

FIG. 4 is a flow diagram outline example processing steps taken in accordance with an embodiment of the present invention;

FIG. 5 is a shown a block diagram of a system according to further embodiment of the present invention;

DETAILED DESCRIPTION

The on-line provisioning of subscriber directory identifiers, such as telephone numbers in mobile communication networks, is used to enable network operators to dynamically associate a directory identifier, such as a mobile station international subscriber directory number (MSISDN) number, with a subscriber identity, such as an IMSI (international mobile subscriber identity) stored on a subscriber identity module (SIM) card. On-line provisioning is typically performed over-the-air the first time a communication device having a subscriber identifier connects to a communication network.

In GSM mobile telephone networks, an IMSI is stored on a subscriber identity module (SIM) card. When a customer purchases, or otherwise obtains, a SIM card, they insert it into a mobile communication device, such as a mobile telephone. When the mobile device is switched on, or otherwise connects to the mobile communication network, signalling messages are sent between the device and the network. The signalling messages sent by the device include the IMSI, and the network determines whether the IMSI stored on the SIM card has not previously been associated, within the network, with an MSISDN. If this is the case, the network associates the received IMSI with an available MSISDN. This associated information is then provisioned to other network elements, such as the authentication centre or HLR 112 such that future communications, such as telephone calls, directed to the associated MSISDN are directed to the communication device having the associated IMSI.

On-line provisioning systems require that the mobile communication network can route connection request messages from a communication device to either to a provisioning system or to other network elements or nodes, such as a home location register (HLR), responsible for authorising the connection attempt. The routing decision is based on whether the IMSI in a received connection request message has previously been associated with an MSISDN by the network.

Current on-line provisioning systems achieve this by maintaining a database, for example accessible from a service transfer point (STP), of all IMSI numbers allocated by the network operator which have been associated with an MSISDN number.

However, not all mobile communication networks are able to route messages based on individual IMSI numbers. For example, some networks do not employ service transfer points or unable to do so. Furthermore, the deployment of an IMSI database is costly in terms of both hardware and maintenance of the data.

Figure 1:
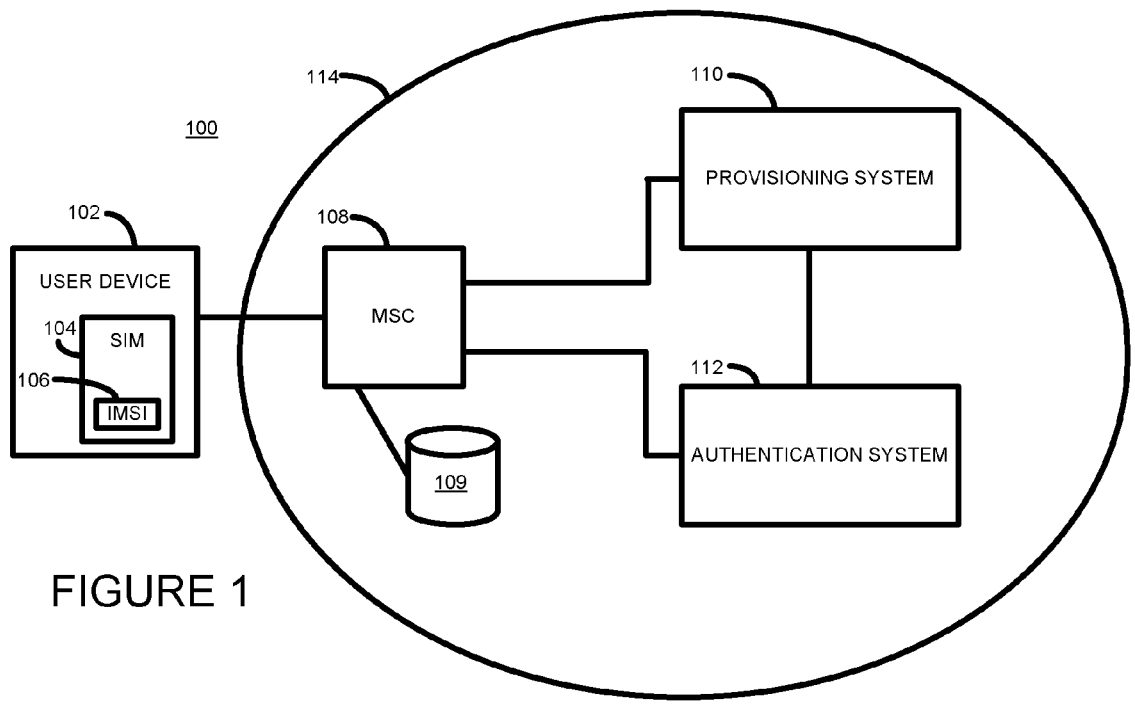
FIG. 1 is a block diagram of a system according to an embodiment of the present invention.

Referring now to FIG. 1 there is shown a simplified block diagram of a system 100 according to an embodiment of the present invention.

A user communication device 102, such as a mobile telephone, connects to a mobile communication network 114 by wirelessly connecting to a mobile switching centre (MSC) 108. In the present embodiment network 114 is a GSM mobile telephone network, although those skilled in the art will appreciate that other networks, such as CDMA and 3G may also be used in alternative embodiments.

The connection to the MSC 108 is made through a base transceiver station (BTS) and a base station controller (BSC) which, for clarity, are not shown. Those skilled in the art will appreciate that, for clarity, not all elements of a mobile telephone network are shown.

The device 102 has an associated subscriber identity module (SIM) card 104 on which is stored a subscriber identity or IMSI 106. The SIM card is in electrical communication with the device 102. When the device 102 attempts to connect to the network 114 the device 102 requests the IMSI 106 from the SIM 104 and the SIM 104 provides a subscriber identity to the device 102. The subscriber identity provided by the SIM 104 is included in messages sent by the device 102 to the network 114 when connecting to the network 114.

The SIM 104 is different, however, from a conventional SIM in that the SIM 104 has functionality that modifies the behaviour of the SIM 104 depending on whether an MSISDN has been previously associated, within the network 114, with the IMSI 106 stored on the SIM 104.

For example, when the device 102 connects to the network 114 when an MSISDN has been previously associated with the IMSI 106, the subscriber identity provided by the SIM 104 is the IMSI 106.

However, when the device 102 connects to the network 114 when no MSISDN has been associated, within the network 114, with the IMSI 106, the subscriber identity provided by the SIM 104 to the device 102 is not the stored IMSI, but is a subscriber identity that is derived from the stored IMSI 106. Hereinafter, a subscriber identity that is derived from the stored IMSI 106 is referred to as a modified IMSI. For example, the modified IMSI may be, for example, the IMSI 106 on which a first predetermined function has been applied. The first predetermined function may be any suitable, logical, mathematical, or other function.

The purpose of the SIM 104 providing a modified IMSI when no MSISDN has been associated, within the network 114, with the IMSI 106 is to enable the network 114 to appropriately route attach requests in a simple and effective manner. As will be explained in further detail below, connection request messages having modified IMSIs are routed to an on-line provisioning system 110, and attach requests having non-modified IMSIs are routed to an authentication centre 112, such as a home location register.

Figure 2:
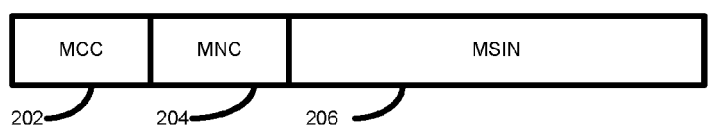
FIG. 2 is a block diagram of a subscriber identifier.
Figure 6:
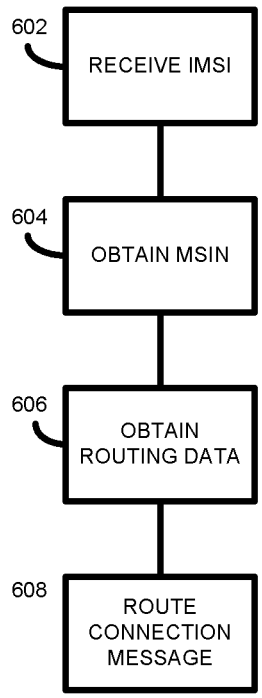
FIG. 6 is a block diagram of a system according to an embodiment of the present invention.
Figure 7:
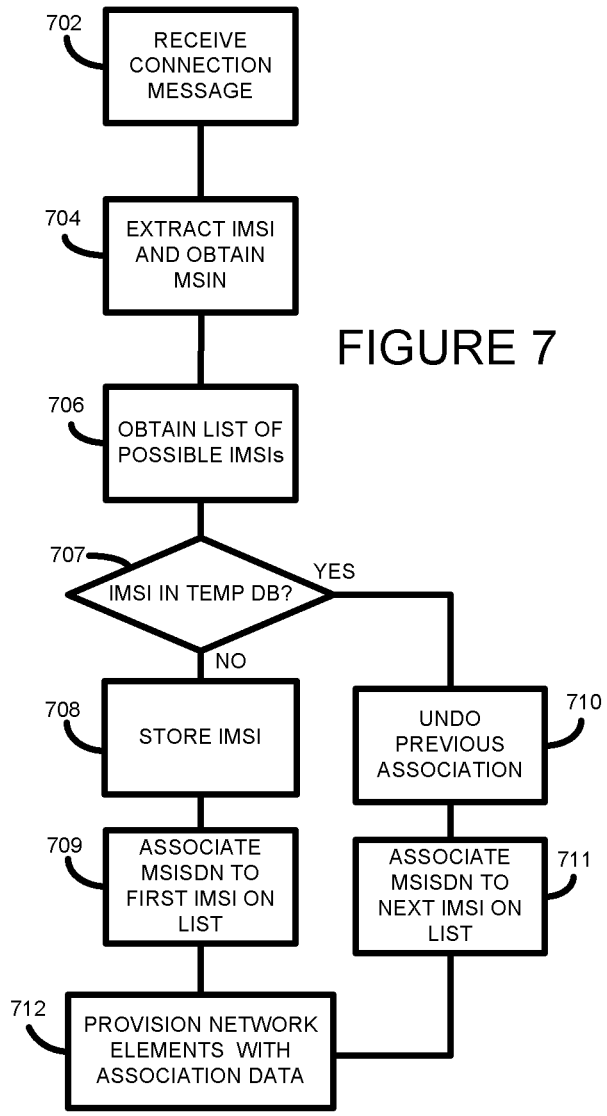
FIG. 7 is a flow diagram outline example processing steps taken in accordance with an embodiment of the present invention.

An IMSI is a numerical identifier up to fifteen digits long, comprised, as shown in FIG. 2, of a three-digit mobile country code (MCC) 202, a two or three-digit mobile network code (MNC) 204, and up to a ten-digit mobile station identification number (MSIN) 206.

In a first embodiment, the first predetermined function applied by the SIM 104 modifies the MCC of the IMSI 106 to a first predetermined MCC. For the purposes of this example, the first predetermined MCC is 999.

Thus, if the IMSI 106 stored in the SIM 104 is 665 073 0123456789, the modified IMSI provided by the SIM 104 when no MSISDN has been associated, within the network 114, with the IMSI 106 will be 999 073 0123456789.

When the device 102 attempts to connect to the network 114, the IMSI provided by the SIM 104 is included in the connection request or attach messages sent by the device 102. As shown in FIG. 3, the MSC 108 receives (step 302) a connection request signalling message including an IMSI and obtains (step 304) the MCC of the received IMSI.

The MSC 108 is configured to have access to a routing table 109 containing routing details of network operators in most or all major countries. The routing table 109 may be stored in a database, a memory, or the like, and may be either integral to or remote from the MSC 108. The routing table 109 is configured by the network operator. At step 306 the routing data for the obtained MCC is obtained, and the connection request message is routed (step 308) based on the obtained routing data.

Connection messages having an MCC corresponding to the MCC of the mobile network 114 are routed to the authentication centre 112. Connection request messages including an IMSI having a foreign MCC are routed to the appropriate foreign network, as determined by the routing table based on the MCC and MNC of the received IMSI.

In the present embodiment, the routing table 109 is configured such that request messages including an IMSI having an MCC having a value of 999 are routed by the MSC 108 to the provisioning system 110. Effectively this establishes the provisioning system 110 as a 'virtual country' within the network 114.

One advantage of this arrangement is that a conventional MSC 108 may be used. This is possible since only the routing table 109 needs to be suitably configured to route connection messages having a predetermined MCC to the provisioning system 110. This also avoids the need to maintain a database, for example accessible from a service transfer point (STP), of all IMSI numbers allocated by the network operator which have been associated with an MSISDN number.

If a connection message is routed to the provisioning system 110 the provisioning system 110 receives (step 402) the connection message including the IMSI. The message may be suitably received, for example, at a suitable receiver module. The receiver module may be suitably implemented, for example, in hardware, as a suitable computer program, as a logic module, or in other suitable manner.

The provisioning system 110 extracts (step 404) the received IMSI and determines (step 406) the original IMSI stored on the SIM 104 by applying a second predetermined function. The second predetermined function may be implemented, for example, in a hardware module, as a suitable computer program, as a logic module, or in any other suitable manner.

In the present embodiment the provisioning system 110 is configured to replace the MCC having a value of 999 in the received IMSI with the MCC allocated to the network operator—in this example 655. By doing so, the provisioning system 110 determines or derives the IMSI 106 stored on the SIM 104.

Once the original IMSI 106 has been determined the provisioning system 110 associates (step 408) an available MSISDN to the determined IMSI and provisions (step 410) this association information to other elements of the network, such as a home location register or authentication centre 112, as appropriate. This enables future communications, such as telephone calls, directed to the associated MSISDN to be directed to the communication device having the associated IMSI.

If the mobile communication network 114 authorises the connection to the network of the device 102, the device 102 is connected to the network 114 in the usual manner. Once the device is successfully connected to the network 114 the SIM 104 is arranged to no longer apply the first predetermined function, such that all future IMSI requests made from a communication device to the SIM 104 will result in the IMSI 106 being returned. Various mechanisms may be used to inform the SIM to no longer apply the first predetermined function. For example, the device 102 may detect that it is successfully connected to the network 114 and may subsequently instruct the SIM 104 to no longer apply the first predetermined function. The provisioning system 110 may, alternatively, send specific messages to the SIM 104 to instruct the SIM 104 to no longer apply the first predetermined function.

The first and second predetermined functions are determined by the network operator. The first predetermined function is included in and is used by each SIM provided by the network operator that is intended to be used with the on-line provisioning system 110. The second predetermined function, corresponding to the first predetermined function, is used by the provisioning system to determine the original IMSI.

In a further embodiment, the first predetermined function on the SIM 104 is configured to modify the MNC of the IMSI 106 to a predetermined value. In a yet further embodiment, the first predetermined function on the SIM 104 is configured to modify both the MCC and the MNC of the IMSI 106 to predetermined values. Providing the routing table 109 is suitably configured connection messages having a predetermined MCC, MNC, or a predetermined MCC and MNC, will be appropriately routed to the provisioning system 110. The provisioning system 110 will have to be suitably configured with an appropriate corresponding second predetermined function to enable the provisioning system 110 determine the original IMSI 106.

However, since the routing tables are configured locally by the operator of the network 114, these techniques are only guaranteed to work when a first attachment of a SIM card 104 is made through the mobile network 114.

Referring now to FIG. 5, there is a shown a block diagram of a system 500 according to further embodiment of the present invention. Like or similar elements to those shown in FIG. 1 are indicated by like references.

In this embodiment an online-provisioning system is provided which enables over-the-air provisioning of an MSISDN through either the home network 114 or through a mobile network other than the mobile network 114.

The first predetermined function applied by the SIM 104 modifies only the first digits of the MSIN 206 of the IMSI 106 to a first predetermined value. For the purposes of this example, the first two digits are modified to have the value 99.

Thus, if the IMSI 106 stored in the SIM 104 is 665 073 0123456789, the modified IMSI provided by the SIM 104 when no MSISDN has been associated, within the network 114, with the IMSI 106 will be 665 073 9923456789.

One advantage of having the SIM 104 modify only the first digits of the MSIN 206 is that the on-line provisioning may be performed from a network foreign to the network 114, since no modifications are made to either the MCC 202 or the MNC 204. Therefore, the routing tables of foreign networks should be correctly configured to route connection messages to an international gateway (not shown) in the network 114 which further routes the connection messages either to the provisioning system 510 or the authentication centre 112.

If the device 102 attempts to connect directly to the network 114, the IMSI provided by the SIM 104 is included in connection request messages sent by the device 102. The MSC 108 receives (step 602) a connection request message including an IMSI and obtains (step 604) the MSIN part of the received IMSI.

The MSC 108 is configured to route messages based on a predetermined range of MSIN numbers to the provisioning system 510. In the present example a connection request message including an IMSI having an MSIN number starting with the digits '99' will be routed to the provisioning system 510. Connection requests having an MSIN outside of this range will be routed to the authentication centre 112. In this way, connection messages having an MSIN in the range 9900000000 to 9999999999 (where the MSIN used by the network provider has ten digits) will be routed to the provisioning system 510.

If a connection message is routed to the provisioning system 510 the provisioning system 510 receives (step 702) the connection message including the IMSI and extracts (step 704) the MSIN from the received IMSI.

In the present embodiment it is assumed that the range of MSIN numbers allocated by the network provider is such that the first digits of the MSIN are used to distinguish between different MSIN numbers. In this case the provisioning system 510 is unable to derive or determine the original IMSI from the received IMSI, if the provisioning system 510 is managing multiple IMSIs, the values of which differ only by the first few digits.

Using the received IMSI, the provisioning system 510 obtains (step 706) a list of possible matching IMSIs from a database 511. For example, if the received IMSI is 665 073 9923456789, this may correspond to a real IMSI in the range 665 073 0023456789 to 665 073 9923456789.

At step 707 the provisioning system 510 determines whether the received IMSI is in the temporary database. If it is not already present, the provisioning system 510 temporarily stores (step 705) the received IMSI in a database, a memory or the like.

Since the provisioning system 510 is unable to determine which IMSI from the list of matching IMSIs is the real IMSI 106 stored on the SIM 104, the provisioning system 510 initially associates (step 709) an MSISDN to the first matching IMSI from the list and provisions (step 712) this association information to other elements of the network, such as a home location register or authentication centre 112, as appropriate.

As will be appreciated by those skilled in the art, the processes involved in authorising a mobile device to connect to a mobile communication network are well known. For example, the authorisation process in GSM mobile telephone networks uses a shared secret Ki, stored only the SIM 104 and in the authentication centre 112.

The authentication step, managed by the MSC 108, consists of requesting, from the authentication centre 112 a random number (RAND) and a first signed response (SRES) for a given IMSI. The signed response is a function of the Ki and the random number. The MSC 108 then sends the random number to the SIM 104, which computes a second signed response using the Ki stored on the SIM 104 and the received random number, and returns the second signed response to the MSC 108. If the first and second signed responses match, the MSC 108 authorises the device 102 to connect to the network.

If, however, the first and second signed responses do not match, this indicates that the IMSI selected by the provisioning system 510 was not the IMSI 106 stored on the SIM 104. In this case, the MSC 108 will re-attempt to connect the device 102 by re-routing the original connection attempt message back to the provisioning system 510.

If this happens, the provisioning system 510 determines (step 707) that the IMSI in the received connection attempt message has recently been received.

In this case, the provisioning system 510 undoes any previous MSIDSN association between the previously chosen IMSI, for example by suitably informing the authentication centre or HLR 112. The provisioning system 510 then associates (step 711) the previously allocated MSISDN with the next IMSI in the list of IMSIs, and the process continues at step 712.

Eventually, the correct IMSI will be chosen by the provisioning system 510, and the device 102 will be successfully connected to the network 114.

After a predetermined length of time, for example 10 minutes, the IMSI received by the provisioning system 510 may be removed from the temporary store 511.

The number of potential matches of the received IMSI with real IMSIs may be reduced, or even avoided all together, by carefully selecting the range of MSINs allocated by the operator of the network 114.

Although the above-described embodiments relate primarily to GSM mobile telephone networks, those skilled in the art will appreciate, however, that the inventive concepts and techniques described herein are in no way limited to GSM or mobile telephone networks and may equally apply to other communications networks, including CMDA, IMS, 3G and 4G networks. Those skilled in the art will also appreciate that subscriber directory identifiers other than MSISDN numbers may be used in other networks. For example depending on the particular situation, a subscriber directory identifier may be a telephone number, a session initiation protocol (SIP) address, an email address, a URI, a network user identifier, or the like.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method, in a communication network, of associating a subscriber directory identifier to a first subscriber identifier, comprising:
   receiving, by a network element in the network, a request to connect a communication device to the network, the request including a second subscriber identifier derived from the first subscriber identifier at the communication device, wherein the second subscriber identifier is different from the first subscriber identifier;
   determining, by the network element, the first subscriber identifier from the received second subscriber identifier; and
   associating, by the network element, the subscriber directory identifier with the determined first subscriber identifier,
   wherein the first subscriber identifier has a first portion and a second portion, and wherein the second subscriber identifier has a first portion that differs from the first portion of the first subscriber identifier, and a second portion that is identical to the second portion of the first subscriber identifier.

2. The method of claim 1, further comprising:
   provisioning the associated subscriber directory identifier and the determined first subscriber identifier to an authentication center; and
   authorizing the communication device to connect to the network.

3. The method of claim 1, wherein receiving the request comprises receiving the request from a network routing element configured to route requests based on a predetermined range of received subscriber identifier.

4. The method of claim 1, wherein the second subscriber identifier in the received message is derived from the first subscriber identifier by performing a first predetermined function on the first subscriber identifier at the communication device.

5. The method of claim 4, wherein determining the first subscriber identifier comprises performing a second predetermined function on the received second subscriber identifier to derive the first subscriber identifier, the second predetermined function corresponding to the first predetermined function.

6. The method of claim 1, wherein determining the first subscriber identifier comprises:
   obtaining, from a database of stored subscriber identifiers, a plurality of stored subscriber identifiers matching a predetermined portion of the received second subscriber identifier;
   selecting the first subscriber identifier from the obtained plurality of stored subscriber identifiers.

7. The method of claim 6, further comprising:
   storing the received second subscriber identifier;
   determining whether the received second subscriber identifier has been previously stored; and wherein in response to determining that the received second subscriber identifier has been previously stored:
disassociating the previously selected first subscriber identifier from a previously associated subscriber directory identifier; and
selecting a subsequent first subscriber identifier from the obtained plurality of stored subscriber identifiers.

8. The method of claim 7, further comprising deleting the stored received second subscriber identifier after a predetermined period of time.

9. The method of claim 1, wherein the network is a mobile telephone network, wherein the subscriber directory identifier is a mobile station international directory number, MSISDN, and wherein the first subscriber identifier is an international mobile subscriber identifier, IMSI.

10. The method of claim 9, wherein the IMSI is stored on a subscriber identity module, SIM, card, and further wherein the received second subscriber identifier is derived by the SIM performing a first predetermined function on the IMSI.

11. The method of claim 10, further comprising informing the SIM to no longer perform the first predetermined function.

12. The method of claim 9, wherein receiving the request comprises receiving the request from a mobile switching center, MSC, the MSC routing requests based on a routing table configured to route connection requests having predetermined range of received subscriber identifier.

13. A network apparatus for associating a subscriber directory identifier to a first subscriber identifier of a communication network, the network apparatus comprising:
a receiver for receiving a request to connect a communication device to the network, the request including a second subscriber identifier derived from the first subscriber identifier at the communication device, wherein the second subscriber identifier is different from the first subscriber identifier;
a non-transitory machine-readable storage to store a program executable on hardware to:
determine the first subscriber identifier from the received second subscriber identifier; and
associate the subscriber directory identifier with the determined first subscriber identifier,
wherein determining the first subscriber identifier comprises determining the first subscriber identifier that has a first portion and a second portion, wherein the first portion of the determined first subscriber identifier is different from a corresponding first portion of the received second subscriber identifier, and wherein the second portion of the determined first subscriber identifier is identical to a corresponding second portion of the received second subscriber identifier.

14. The method of claim 1, wherein the first portion of the first subscriber identifier includes a mobile country code, and the first portion of the second subscriber identifier includes a mobile country code that is different from the mobile country code of the first subscriber identifier, and the second portion of the first subscriber identifier includes a mobile station identification that is identical to a mobile station identification of the second subscriber identifier.

15. The method of claim 1, wherein the first portion of the first subscriber identifier includes a mobile network code, and the first portion of the second subscriber identifier includes a mobile network code that is different from the mobile network code of the first subscriber identifier, and the second portion of the first subscriber identifier includes a mobile station identification that is identical to the mobile station identification of the second subscriber identifier.

16. The method of claim 1, wherein the first portion of the first subscriber identifier includes a mobile country code, and the first portion of the second subscriber identifier includes a mobile country code that is identical to the mobile country code of the first subscriber identifier, and the second portion of the first subscriber identifier includes a mobile station identification that is different from a mobile station identification of the second subscriber identifier.

* * * * *

UNITED STATES PATENT AND TRADEMARK OFFICE
CERTIFICATE OF CORRECTION

| | | |
|---|---|---|
| PATENT NO. | : 8,706,101 B2 | Page 1 of 1 |
| APPLICATION NO. | : 13/375881 | |
| DATED | : April 22, 2014 | |
| INVENTOR(S) | : Philippe Bouckaert et al. | |

It is certified that error appears in the above-identified patent and that said Letters Patent is hereby corrected as shown below:

In the Claims

In column 9, line 13, in Claim 9, after "international" insert -- subscriber --.

In column 9, line 17, in Claim 10, delete "SIM," and insert -- SIM --, therefor.

Signed and Sealed this

Thirteenth Day of January, 2015

Michelle K. Lee
*Deputy Director of the United States Patent and Trademark Office*